US011865582B2

United States Patent
(12) United States Patent
Rafferty

(10) Patent No.: US 11,865,582 B2
(45) Date of Patent: Jan. 9, 2024

(54) COMBINATION SCREENING APPARATUS

(71) Applicant: Portafill International Limited, Omagh (GB)

(72) Inventor: Malachy James Rafferty, Omagh (GB)

(73) Assignee: Portafill International Limited, Omagh (GB)

( * ) Notice: Subject to any disclaimer, the term of this patent is extended or adjusted under 35 U.S.C. 154(b) by 0 days.

(21) Appl. No.: 17/679,768

(22) Filed: Feb. 24, 2022

(65) Prior Publication Data

US 2022/0288639 A1 Sep. 15, 2022

Related U.S. Application Data

(60) Provisional application No. 63/161,202, filed on Mar. 15, 2021.

(51) Int. Cl.

*B07B 1/24* (2006.01)
*B07B 13/07* (2006.01)
*B07B 1/00* (2006.01)
*B07B 11/06* (2006.01)

(52) U.S. Cl.

CPC ................ *B07B 1/24* (2013.01); *B07B 1/005* (2013.01); *B07B 11/06* (2013.01); *B07B 13/07* (2013.01)

(58) Field of Classification Search

CPC .... B07B 1/00; B07B 1/15; B07B 1/22; B07B 1/24; B07B 1/005; B07B 13/07; B07B 15/00

USPC .................................................. 209/270, 271

See application file for complete search history.

(56) References Cited

U.S. PATENT DOCUMENTS

| | | | | |
|---|---|---|---|---|
| 2,966,267 | A * | 12/1960 | Dunbar | B07B 1/15 209/672 |
| 5,248,042 | A | 9/1993 | Kuhmonen | |
| 5,361,909 | A | 11/1994 | Gemmer | |
| 7,882,958 | B2 | 2/2011 | Doppstadt | |
| 8,505,738 | B2 | 8/2013 | O'Keeffe et al. | |
| 2008/0041984 | A1 | 2/2008 | Sauser et al. | |
| 2010/0326065 | A1* | 12/2010 | Permi | B07B 1/005 241/34 |
| 2012/0285868 | A1* | 11/2012 | Sierens | B07B 1/24 209/288 |

FOREIGN PATENT DOCUMENTS

| | | |
|---|---|---|
| DE | 29809345 U1 | 10/1998 |
| EP | 1136130 A2 | 9/2001 |

(Continued)

OTHER PUBLICATIONS

Extended European Search Report for corresponding EP Application No. 21162485.3 dated Aug. 23, 2021, 7 pages.

*Primary Examiner* — Michael McCullough
*Assistant Examiner* — Jessica L Burkman
(74) *Attorney, Agent, or Firm* — Faegre Drinker Biddle & Reath LLP

(57) ABSTRACT

The present invention provides a combination screening apparatus for screening a mixed material into three graded streams, comprising a disc screen wholly, substantially or partly located within a rotary drum screen. The present invention may be conveniently arranged on a mobile chassis with a simple arrangement of a feed hopper to feed a feed end, and a layered or stacked configuration for the discharge of the so-formed graded streams at a discharge end.

14 Claims, 11 Drawing Sheets

(56) References Cited

FOREIGN PATENT DOCUMENTS

| | | | |
|---|---|---|---|
| EP | 1391251 | A2 | 2/2004 |
| EP | 1648623 | A1 | 4/2006 |
| EP | 3482836 | A1 | 5/2019 |
| EP | 3799967 | A1 | 4/2021 |
| GB | 2309923 | A | 8/1997 |
| IT | UB20155871 | A1 | 5/2017 |
| WO | 2005014186 | A1 | 2/2005 |
| WO | 2013131145 | A1 | 9/2013 |
| WO | 2021123502 | A1 | 6/2021 |

* cited by examiner

COMBINATION SCREENING APPARATUS

RELATED APPLICATIONS

This application is related to and claims priority from U.S. Provisional Application No. 63/161,202 filed Mar. 15, 2021, the disclosure of which is incorporated herein by reference in its entirety.

FIELD OF THE INVENTION

The present invention relates to combined screening apparatus for separating, unconsolidated feed materials that contain a mixture of particle sizes into two or three streams of different particle sizes. This process is known as screening.

BACKGROUND

Quarries, building sites, waste processing facilities and composting facilities utilise various types of screening technologies. The chosen technology will depend on the application, feed material and the desired separation. Typically, screening machines start with a feed hopper or the like, a mechanical screen, and one or more conveyors to transfer the processed materials to a nearby location or to a secondary processing plant. Screening machines can be either mobile or static.

One type of mechanical screen is a trommel, or drum screen. This screen is a rotating mechanical screener used to separate a variety of materials into different particle sizes. It has a perforated cylindrical drum. Separation is achieved by rotating the drum to agitate and move the material along the drum's screening surface. Machines containing drum screens, commonly referred to as 'trommels', are known in the art in the pre-treatment of mixed commercial and municipal wastes; as well as for screening materials such as soil, biomass, ores, rock, sand, and aggregates.

A second type of mechanical screen is a disc screen, also known as a star screen. This is a mechanical screen used to separate materials into different particle sizes. It consists of a series of shafts on which rotating star or disc type wheels are mounted. The spacing between the shafts and the wheels determines the respective openings. The material smaller than the openings falls through the openings, while material greater than the apertures continues to move along the screening surface until it exits the screen.

Feed materials for screening that contain high volumes of damp, bulky and/or non-uniform constituents such as biomass, plastic, textiles, newspaper, and cardboard, can be problematic and difficult to screen. These materials can cover, clog, or become lodged in the openings of a drum screen, reducing the screen's ability to operate efficiently, a problem commonly referred to as "blinding" and "plugging" within the industry.

Bulk materials are also particularly problematic when trying to separate fine particles. While a disc screen is better suited for screening such materials, it is not as effective at screening fine particles compared to a drum screen in applications containing a low percentage of bulk material.

As a solution, the industry often utilises additional apparatus, units or equipment, to handle difficult to screen materials such as pre-sorting, secondary screening and shredding, all of which add considerable cost. Disc screens, for example, are usually employed to 'scalp', i.e., remove oversize material in applications where there is a high percentage of bulk materials.

The use of multiple apparatus in series is known. U.S. Pat. No. 7,882,958B2 discloses a disc screen located on top of a feed hopper directly before a drum screen, so that oversize material flows in the opposite direction away from the drum screen.

SUMMARY OF THE INVENTION

As a solution to the problem described above, the present invention details an integrated trommel and disc screen unit; described as a 'combination screen' comprising of at least one revolving screening drum, a series of driven shafts and discs mounted on an inner supporting frame, one feeder and at least one collection device. The invention is characterised by the fact that the disc screen assembly is position inside the drum screen, with the disc screen assembly anchored in place at either end relative to the feeder while the drum screen remains free to rotate.

Thus, according to one aspect of the present invention, there is provided a combination screening apparatus for screening a mixed material into three graded streams, comprising a disc screen wholly, substantially or partly located within a rotary drum screen.

According to another aspect of the present invention, there is provided a method of grading a mixed material into three graded streams, comprising at least the steps of:

- providing a combination screening apparatus comprising a disc screen wholly, substantially or partly located within a rotary drum screen;
- locating the mixed material onto an inlet end of the disc screen; and
- operating the rotary drum screen and the disc screen to provide three graded streams therefrom.

BRIEF DESCRIPTION OF THE DRAWINGS

The invention will be more clearly understood by the following descriptions of some embodiments thereof, given by way of example only, and with reference to accompanying drawings, in which.

FIG. **4*a*** is a detailed view of a disc screen embodiment.

FIG. **4*b*** is detailed plan view of a disc screen embodiment

Figures 5, 5A:
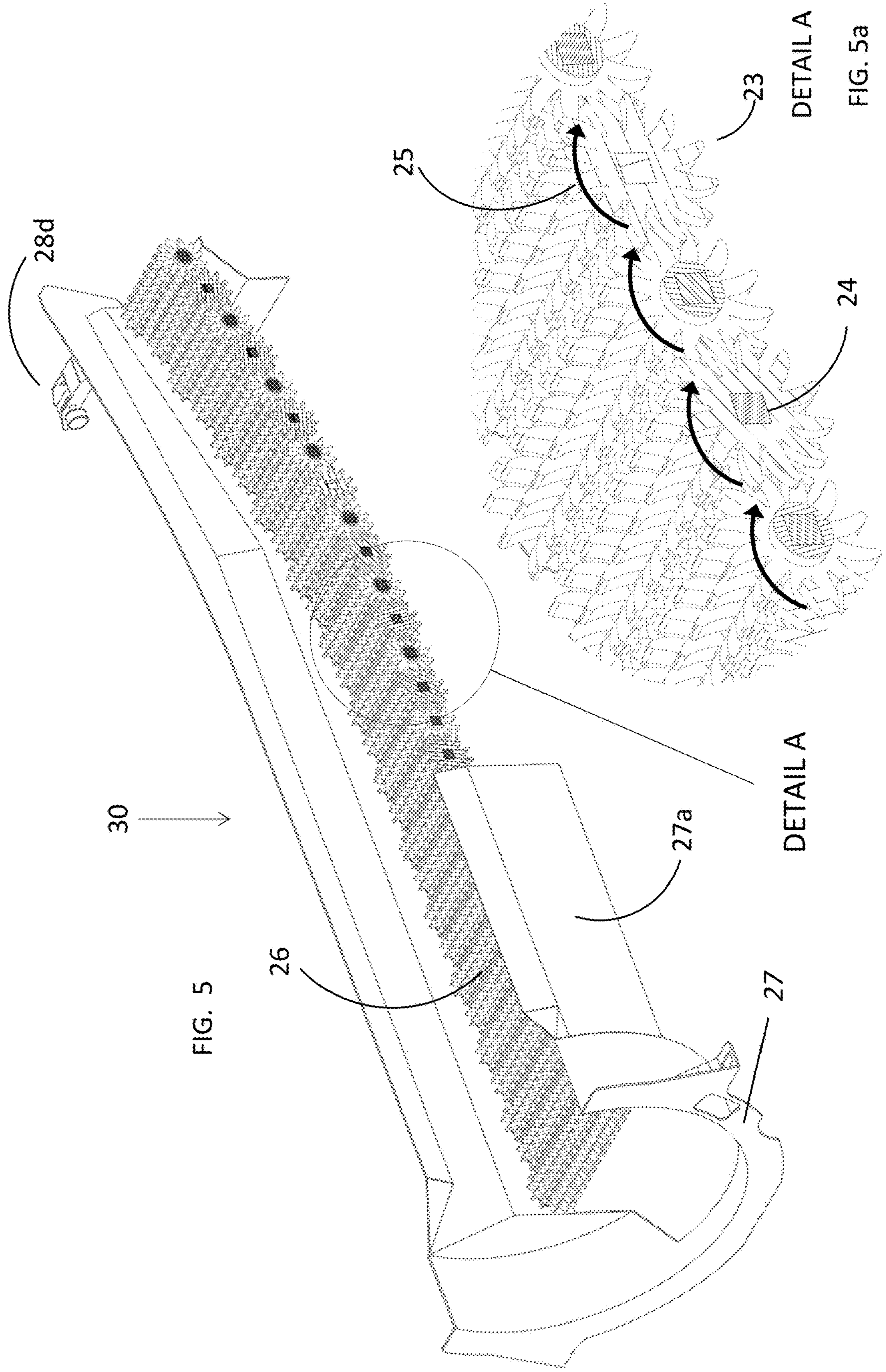

FIG. 5 is a sectional perspective view of a disc screen according to the invention FIG. **5*a*** is a detailed sectional view of the disc rollers.

Figure 6:
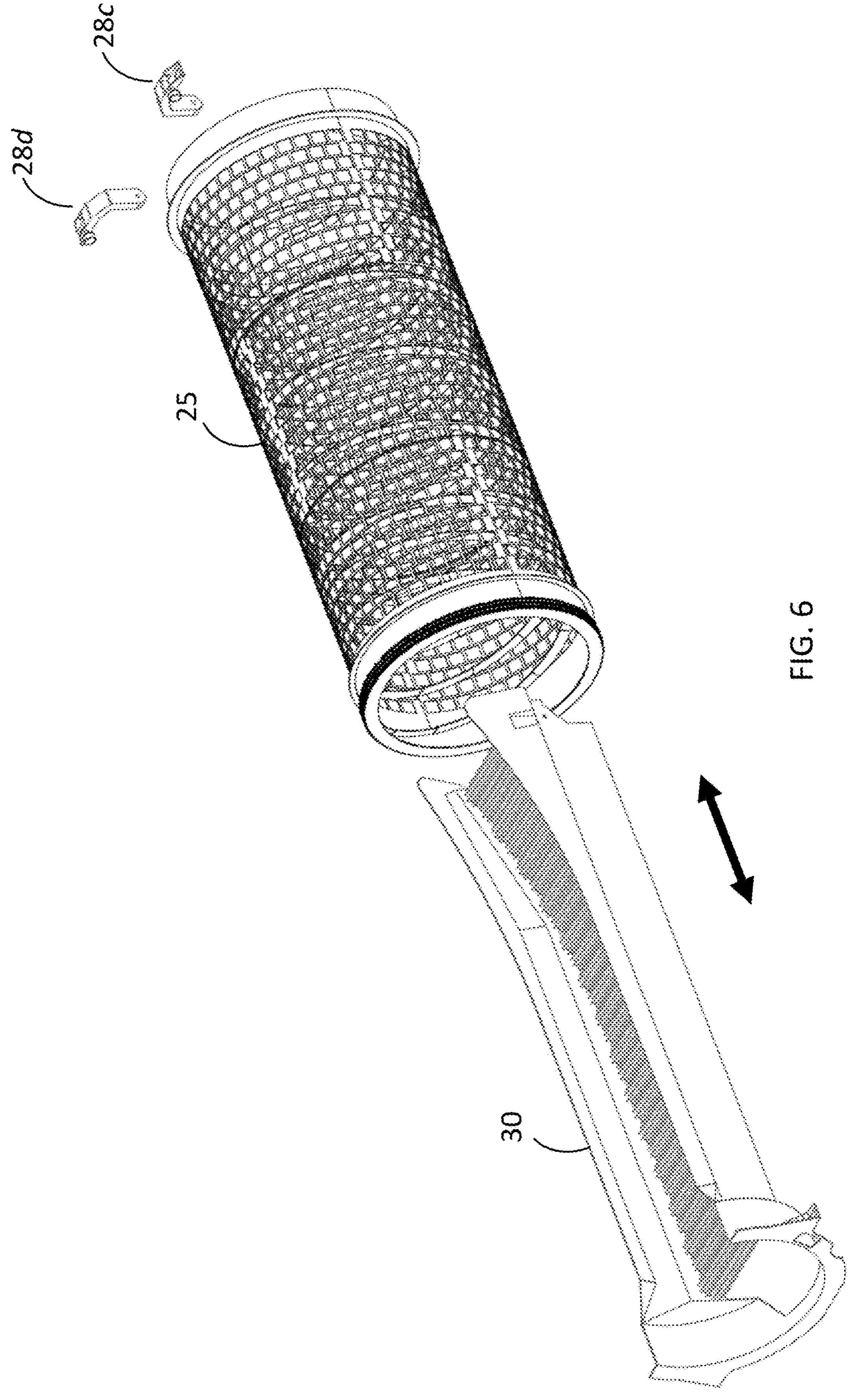

FIG. 6 is an exploded view of a combination screen according to the invention.

Figure 7:
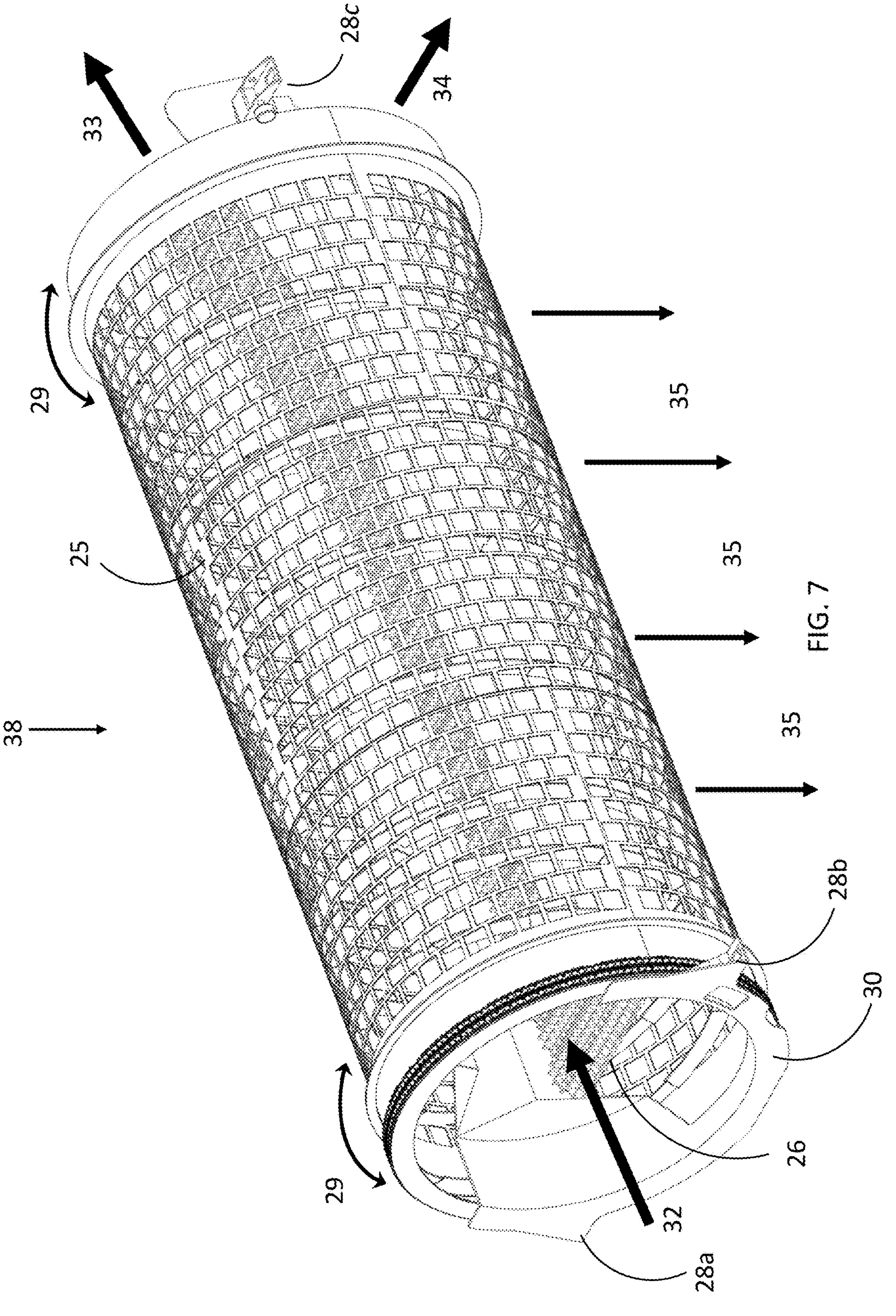

FIG. 7 is a perspective view of a combination screen according to the invention.

Figure 8:
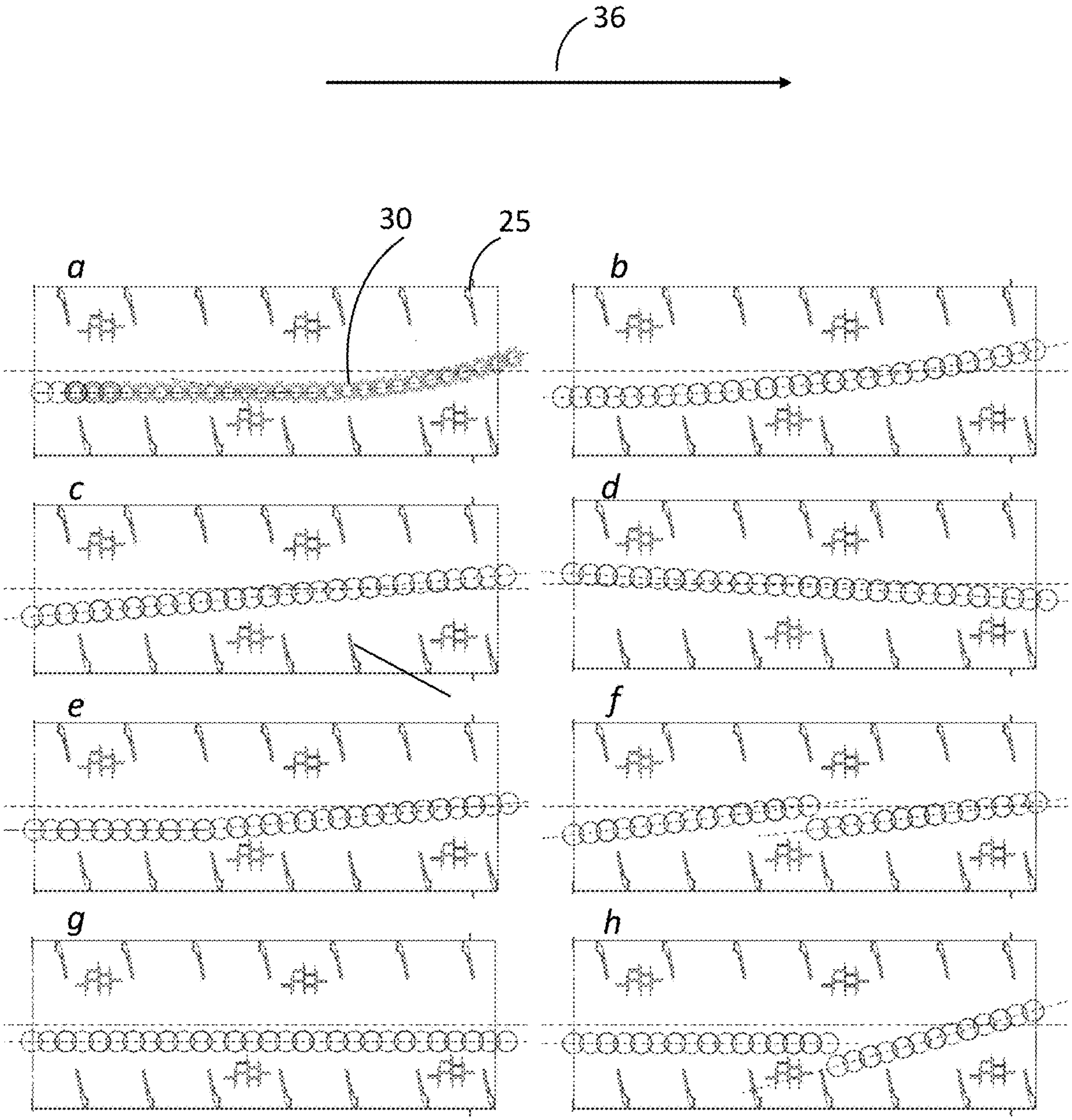

FIG. 8 are illustrations of various disc roller configurations in relation to the drum screen and in relation to the flow of material.

Figure 9:
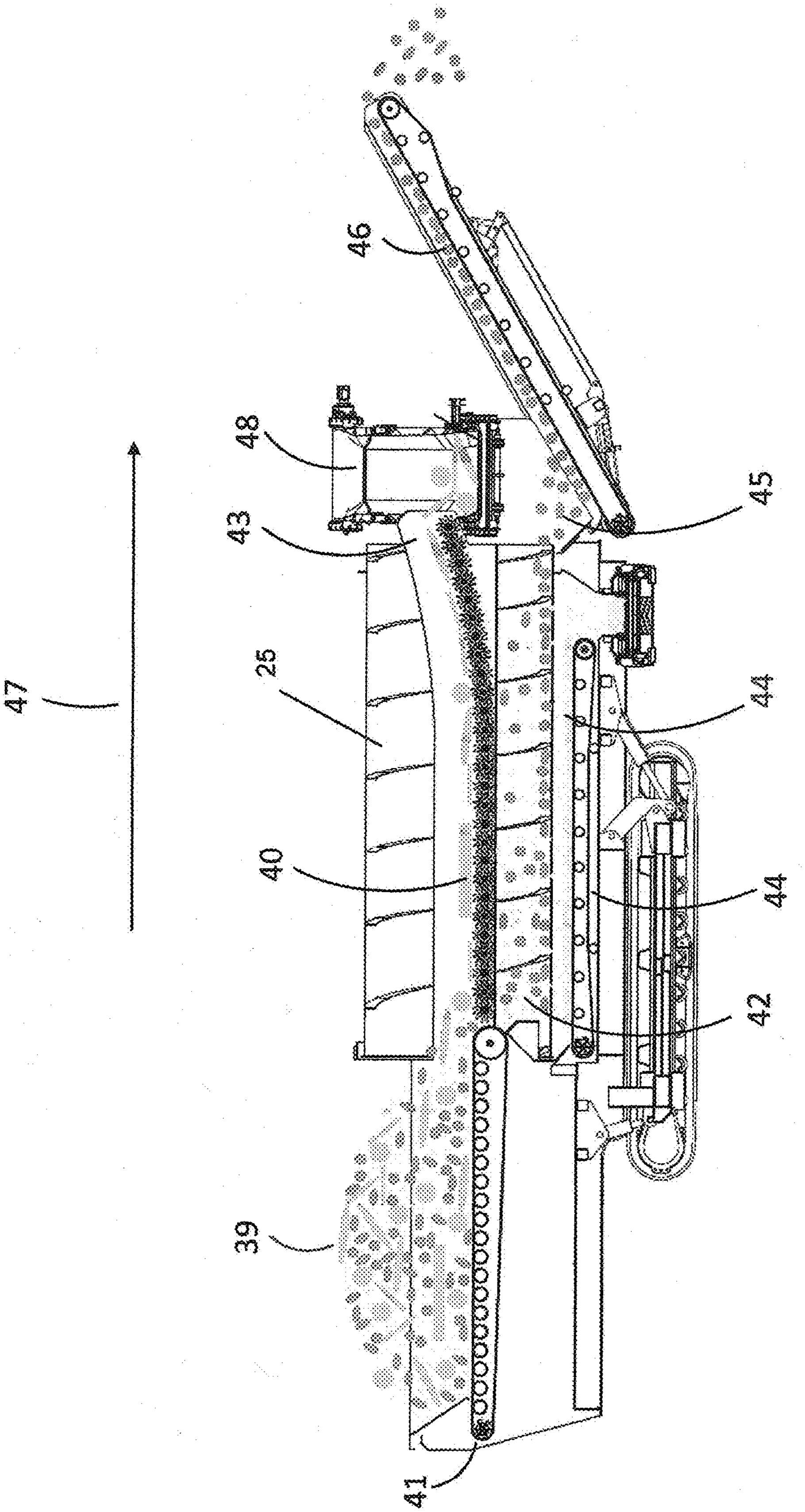

FIG. 9 is a working illustration of a three-way split plant showing material flow according to the invention.

Figure 10:
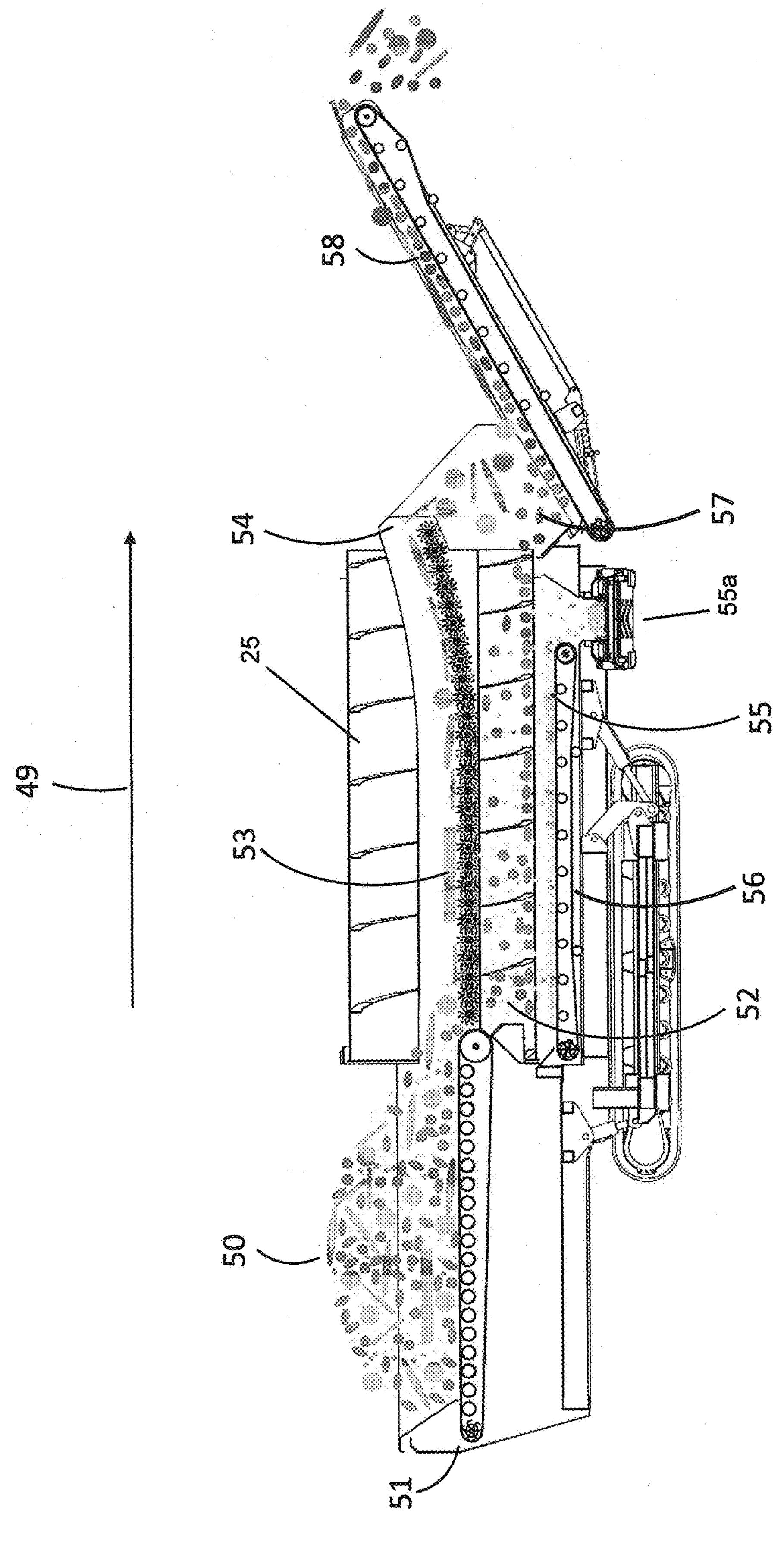

FIG. 10 is a working illustration of a two-way split plant showing material flow according to the invention.

Figure 11:
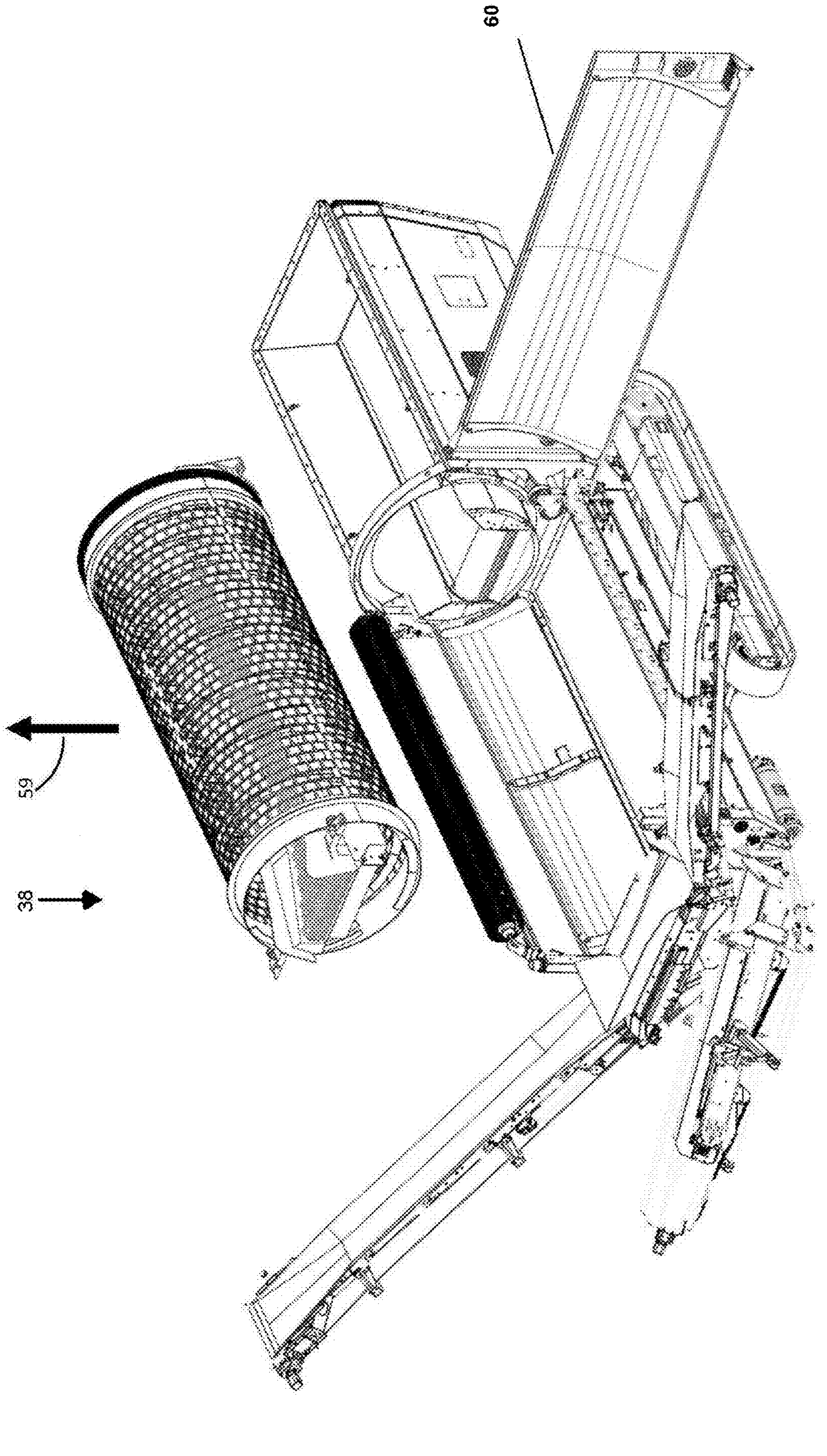

FIG. 11 is a perspective view illustration the removal of combination screen from a screening machine according to the invention.

DETAIL DESCRIPTION OF PREFERRED EMBODIMENTS

The present invention provides a combination screening apparatus for screening a mixed material into three graded streams, comprising a disc screen wholly, substantially or partly located within a rotary drum screen.

In this way, the present invention provides a multi-deck screening apparatus for screening a mixed material into three graded streams, the apparatus comprising two or more overlapping screening decks. Optionally, the present invention provides a mobile multi-deck screening apparatus for screening a mixed material into three graded streams, the apparatus comprising two or more overlapping screening decks and at least three discharge conveyors.

Optionally, two of the graded streams are combined prior to conveyance away from the apparatus.

Optionally, the apparatus is for screening a mixed material into more three graded streams, by additional processing or screening or separation, prior to conveyance away from the apparatus.

The present invention can be provided as an integrated rotary or trommel screen or unit, and a disc screen unit or assembly. The invention is characterised by the disc screen assembly positioned at least partly within or inside the rotary drum screen.

Optionally, the apparatus is provided on a chassis or frame. Optionally, the apparatus is a mobile screening apparatus. Optionally, the apparatus has a tracked chassis, comprising two caterpillar tracks able to relocate the apparatus around a site for multiple use. The apparatus may be mobile using wheels, tracks, and other such means, or combinations of same.

Alternatively, the apparatus is a static or fixed plant.

Typically, the apparatus has a main frame or chassis, and one or more sub-frames.

The invention generally has a feed or input end, and a discharge or outlet end or ends, in that different graded streams may be provided from the apparatus from different locations.

The feed end is for input of mixed material to be processed, starting with the disc screen. The direction in which the mixed material moves from the feed to the discharge is referred to as material flow or the direction of material flow.

Optionally, the apparatus further comprises a feed hopper for the mixed material, further optionally an integral feeder hopper, next to or otherwise near the feed end.

The feed mixed material may comprise any mixture, including materials from quarries, building sites, waste processing facilities and composting facilities, including but not limited to feed materials that contain high volumes of damp, bulky and/or non-uniform constituents such as biomass, plastic, textiles, newspaper, and cardboard. This includes waste materials such as, construction and industrial waste (C&I), constructions and demolition waste (C&D), biomass, and Municipal solid waste (MSW).

The term 'discharge' is used herein to describe the material exiting the apparatus as a graded stream, typically for subsequent collection and stockpiling for further use or processing.

The term 'disc screen' is used herein to include screens comprising a series of spaced rotating drums or rollers or shafts, arranged in a generally linear direction, with defined openings thereinbetween to provide the screening.

The disc screen may be arranged to angle or incline (relative to a ground surface), or to have one or more differently angled or inclined portions.

One disc screen comprises a series of shafts, optionally with a rough or roughened surface, with defined openings or spacings thereinbetween.

Various other disc screens are known in the art, typically having a series of shafts on which rotating star or disc type wheels or other shapes are mounted. The spacing between the shafts and the wheels determines the respective openings in the screen.

Separation is achieved by rotating the shafts simultaneously in the same direction to agitate and move material across the top of the shafts, discs or wheels, and so along the screen's surface. Those items, parts or particles of the material that are smaller than the openings fall through the openings, while those parts, etc. greater than the apertures continue to move along the screening surface until it exits the screen.

Disc screens are particularly suited for screening damp and bulk materials, and are particularly useful for screening biomass as they provide good agitation, which is necessary for separating the particles that tend to knit together.

Optionally, the disc screen comprises a series of discs mounted on driven shafts.

Optionally, the discs a shape selected from the group comprising: a polygon, circular, egg, ovoid or a star shape.

Optionally, the disc screen comprises two or more disc screens in series, extending at least partially along the length of the rotary drum screen.

The present invention also allows for alternative openings in the disc screen; as well as allowing for the number, size, and distance of the shafts or the discs relative to one another on the shafts to be varied. The desired openings will depend on the use of the apparatus and the nature of the mixed material to be screened.

Optionally, the disc screen is mounted on a disc frame, and the disc frame securable to the rotary drum screen. Typically the rotary drum screen comprises a cylindrical drum, rotated on or by a frame, optionally at least partly in an outer housing. The disc frame may be secured to each end of the frame or housing, and extend through the drum.

Optionally, the disc frame includes a disc drive mechanism to drive the shafts and discs. The mechanism is typically a series of drive chains and cogs, able to transfer power from a motor or the like on the apparatus to the relevant shafts to drive all the discs. Such mechanisms are known in the art, and can be protected by the disc frame in use.

In the present invention, disc screen wholly, substantially or partly located within the rotary drum screen, such that the screen vertically overlap. Optionally, the screens overlap by at least 1 metre. Optionally, the screens substantially overlap, with less than 2 metre or 1 metre of non-overlap of the disc screen within the rotary drum screen. The disc screen may extend beyond one or both ends of the rotary drum screen, or start within one or both ends of the rotary drum screen, or a combination of same.

Optionally, the disc screen has a feed end located within one end of the rotary drum screen. Optionally, the disc screen has a feed end located approximately 1 metre or more than 1 metre beyond one end of the rotary drum screen.

Optionally, the disc screen has a discharge end beyond the discharge end of the rotary drum screen. Optionally, the disc screen has a discharge end located approximately 1 metre or more than 1 metre beyond the discharge end of the rotary drum screen.

Optionally, the disc frame provides side walls to the disc screen, to retain material on the disc screen that is not sized to pass through its apertures until reaching the discharge end of the disc screen.

Optionally, the present invention allows for alterations to the disc and shaft configuration and for the replacement of discs that have become worn or damaged.

Optionally, the present invention also provides alternative disc screen configurations, ordinations, and angles; relative to the drum screen. The disc screen can also be configured with one or more disc screen embodiments which can be arranged below or in line with each other.

The disc screen may have any suitable configuration relative to the rotary drum screen. Where the rotary drum screen has a longitudinal centre line along its drum length, the disc screen may wholly or substantially be positioned in line with such longitudinal centre line, optionally above or below the longitudinal centre line, and optionally being wholly, substantially or partly inclined relative to the longitudinal centre line.

Optionally, the discs screen may be planar or substantially planar along the longitudinal centre line of the rotary drum screen.

Optionally, the disc screen has a feed end and a discharge end, wherein the discharge end is relatively higher from a ground surface than the inlet end. Optionally, the discharge end is relatively higher from a ground surface than the inlet end at or near the end of the disc screen in the form of an end' uplift' of the disc screen relative to the longitudinal centre line of the rotary drum screen.

Various examples of configurations of the discs screen relative to the rotary drum screen are shown in the accompanying drawings, and the skilled person can see other possible configurations that may be provided to suit particular mixed materials, or desired grades of the discharge streams.

Those items, parts or particles of the mixed material that are smaller than the openings in the disc screen, fall through the openings, while those parts, etc. of the mixed material greater than the apertures continue to move along the screening surface until it exits the screen, and provide a first graded stream, which can be termed the ‘oversized stream’.

The material that passes through the openings in the disc screen falls by gravity into the rotary drum screen surrounding the disc screen.

Rotary drum screens are known in the art, and generally comprise a rotating mechanical screen able to separate a variety of materials into different particle sizes. The screen has a perforated cylindrical drum with various aperture sizes, rotated on or by a frame, and with a feed or input end, and a discharge or output end. Separation is achieved by rotating the drum to agitate and move the material along the drum’s screening surface.

Those items or parts or particles of the mixed material smaller than the apertures of the rotary drum screen pass through the screen to provide a second graded stream, which can be termed an ‘undersized stream’. Those particles, etc. of the mixed material bigger than the apertures in the rotary stream (but smaller than the apertures in the disc screen), which can be termed a ‘midsized stream’, continue to move along the drum’s screening surface until they exit the screen at the discharge end as a third graded stream.

Depending on the desired separation, the apertures in the rotary drum screen can vary in sizes and shape. Machines containing drum screens, commonly referred to as ‘trommels’, are known in the art in the pre-treatment of mixed commercial and municipal wastes; as well as for screening materials such as soil, biomass, ores, rock, sand, and aggregates.

Optionally, the rotary drum screen has apertures that vary in size and shape, and/or the drum screen itself can vary in size or shape. For example, the rotary drum screen can be circler or polygon in shape.

Optionally, the apparatus comprises one or more discharge conveyors to discharge and convey one or more of the three graded streams away from the apparatus. The conveyors may be those known in the art, generally having a feed end proximal to the discharge of a graded stream from the apparatus, and a distal end away from the apparatus. Typically, the conveyors are directed away differently from the apparatus, to allow each collection and/or stockpiling to be distinct or separate.

In one embodiment, the apparatus comprises two conveyors to discharge two graded streams away from the apparatus.

In another embodiment, the apparatus comprises three conveyors to discharge the three graded streams separately away from the apparatus.

In another embodiment, the apparatus comprises three conveyors and is switchable between discharging two or three graded streams separately away from the apparatus. Depending on the configuration of the apparatus, this is known as a “two-way-split”, and a “three-way-split”. In this arrangement, one discharge conveyor is a switchable conveyor selectively switchable between an active state such that each discharge conveyor discharges one graded stream, to an inactive state such that one discharge conveyor discharges two graded streams. This provides a method of switching the discharge of a mixed material graded into three graded streams, comprising at least the steps of:

providing a mobile multi-screen screening apparatus for screening the mixed material into three graded streams, such apparatus comprising two or more overlapping screening decks and at least three discharge conveyors, selectively switching one discharge conveyor between an active state such that each discharge conveyor can discharge one graded stream, to an inactive state such that one discharge conveyor can discharge two graded streams.

In one embodiment of the present invention, the apparatus comprises at least three discharge conveyors; a conveyor for collecting and discharging the oversized stream or fraction, referred to as an oversize conveyor; a conveyor for collecting and discharging the midsized stream or fraction, referred to as an midsize conveyor; an internal conveyor for collecting the undersized stream or fraction, referred to as a collection conveyor; a conveyor for discharging the undersized fractions, referred to as an undersize conveyor.

Optionally, the oversize conveyor can be moved to divert the flow of oversized material to the midsize conveyor, allowing the midsize conveyor to function as a two in one discharge conveyor, as in the midsize conveyor can be repurposed and used to collect and transfer the oversized and midsized material together as one fraction, thus making the oversize conveyor unrequired. With this configuration, the invention can produce oversized and undersized fractions only. The oversize conveyor can moved back into position to collect and discharge the oversized material, allowing the screening machine to revert to providing oversized, midsized, and undersized fractions.

Optionally, the apparatus includes one or more discharge collection stations for the graded streams. A discharge collection station may be a chute, tray, hopper or conveyor, and may provide for the recombination of two or more of the graded streams.

The present invention is able to separate the feed mixed material into three grades according to their size, hereinafter referred to as an 'oversized stream', a 'midsized stream', and an 'undersized stream'.

The oversized stream is typically bulk material, such as those materials described above.

The present invention also provides a method of grading a mixed material into three graded streams, comprising at least the steps of:

providing a combination screening apparatus comprising a disc screen wholly, substantially or partly located within a rotary drum screen;

locating the mixed material onto an inlet end of the disc screen; and operating the rotary drum screen and the disc screen to provide three graded streams therefrom.

In an embodiment of the invention, a feed mixed material enters the disc screen via a hopper, conveyor, or the like. The undersized and midsized particles fall through the disc screen openings and onto the rotary drum screen's inner screening surface below the disc screen.

The oversized particles continue to flow along the disc screen until they exit the screen at the discharge end as a first graded stream.

The undersized particles pass through the drum screen and rotary drum screen, and optionally onto a collection conveyor, and onto a collation bay for stockpiling.

The midsized particles retained within the rotary drum screen flows along the drum's screening surface until it exits the screen at the discharge end as another graded screen. Depending on the configuration of the apparatus, the oversized and midsized material can be conveyed and stockpiled separately, known as a "three-way-split", or conveyed and stockpiled together, known as a "two-way-split".

Optionally, either the disc screen or the rotary drum screen, or both the disc screen and the rotary drum screen of the apparatus are removable from the apparatus.

For example, both the disc screen and the rotary drum screen can be maintained as a combination screen, to be fitted into another processing plant as one single unit or as separate segments.

In another example, either the disc screen or the rotary drum screen can be reconfigured with alternative rotary drum screen or disc screen arrangements.

Optionally, the apparatus comprises an openable rotary drum screen housing, such that opening of the housing allows the removal of either the disc screen or the rotary drum screen, or both the disc screen and the rotary drum screen.

Optionally, the rotary drum screen and/or the disc screen embodiments can be disconnected from one another and used as standard stand-alone screens.

Figure 1:
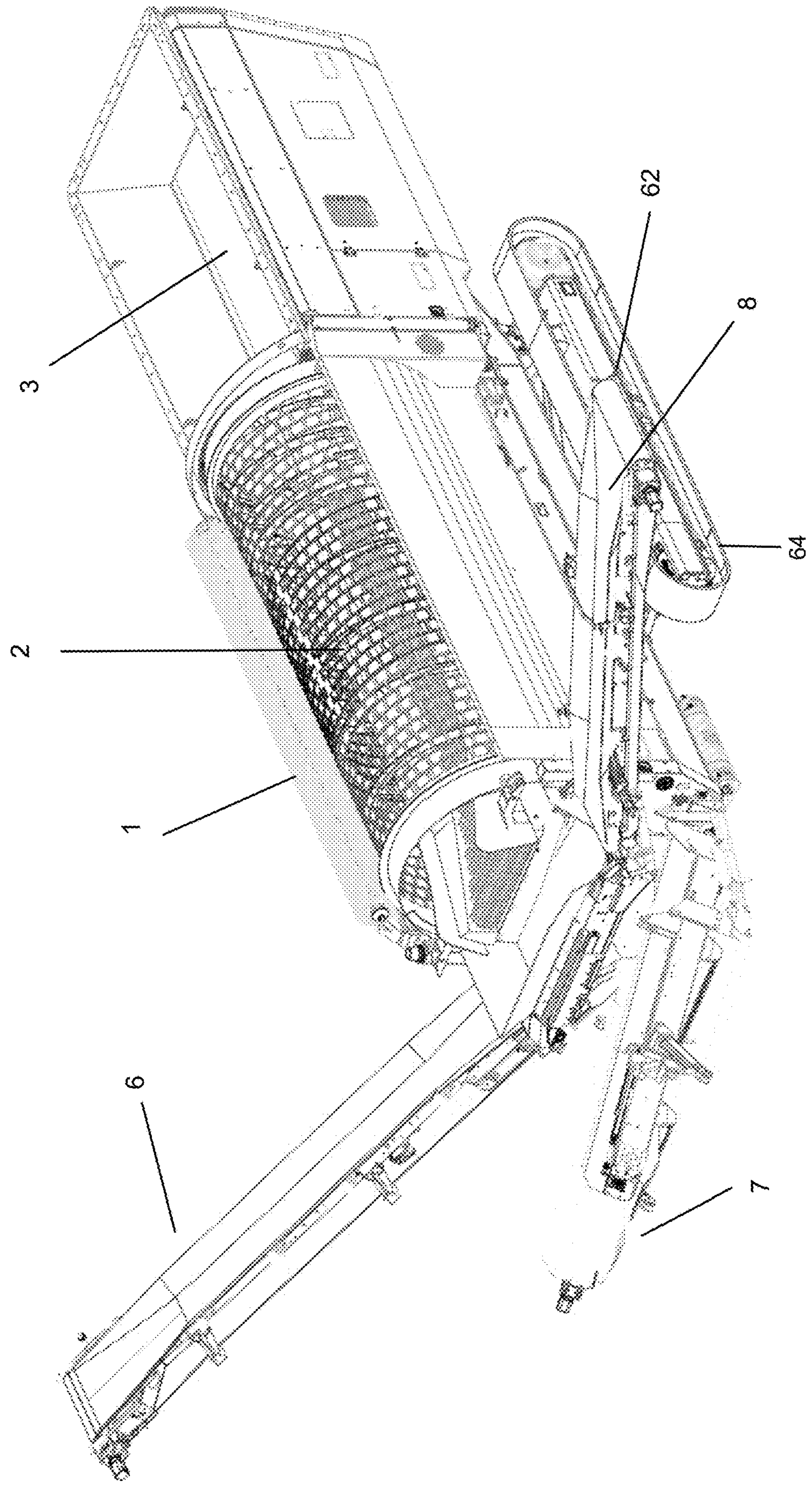
FIG. 1 is a perspective view of a screening machine according to the invention.
Figure 2:
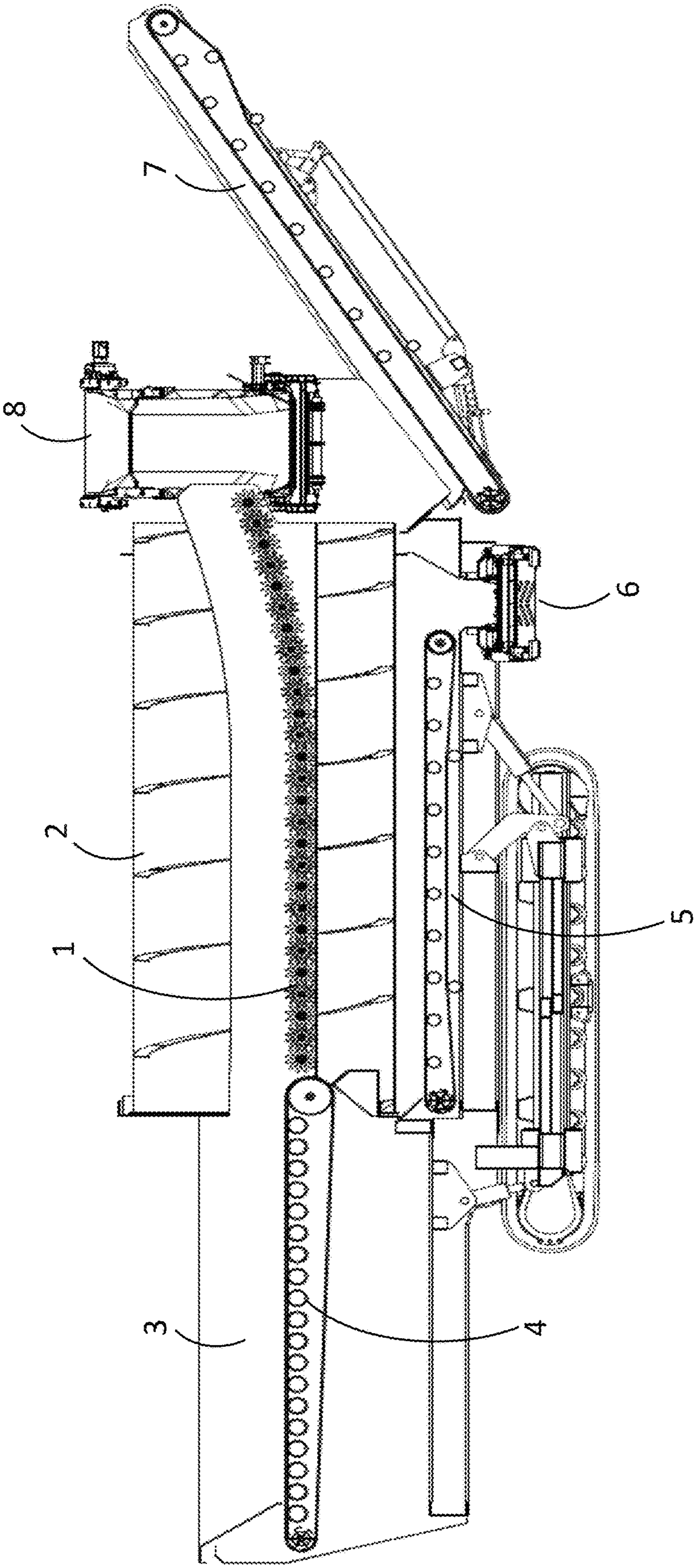
FIG. 2 is a side sectional view of a screening machine according to the invention.

Referring to the drawings, FIG. 1 shows an example of a mobile screening apparatus in connection with the present invention. FIG. 2 is a section through the apparatus of FIG. 1. FIGS. 1 and 2 show a disc screen 1 comprising a series of driven shafts and disc mounted on a supporting frame inside a rotary drum screen 2.

The apparatus includes a hopper 3 and feed conveyor 4 inline and adjacent to a feed end of the disc screen 1. The apparatus is on a mobile chassis 62 having two caterpillar tracks 64 so as to be mobile around a site or other location.

The apparatus also includes an internal collection conveyor 5 positioned directly underneath the drum screen 2 for collecting and transport of that material that passes through the disc screen 1 and the drum screen 2 to a first discharge conveyor 6.

The apparatus also includes a second discharge conveyor 7 in line with the longitudinal direction of the apparatus, and able to collect and convey that material that passes through the disc screen 1 and exits the discharge end of the screening drum 2.

The apparatus also includes a third discharge conveyor 8 positioned above the second discharge conveyor 7 and having a collection tray 8*a*, able to collect and convey the discharged material that does not pass through the disc screen 1.

The discharge conveyors 5/6/7/8 can be reconfigured, repositioned, or used to transport material to a stockpile, or to secondary processing unit or plant, or for transportation to another location.

Figure 3:
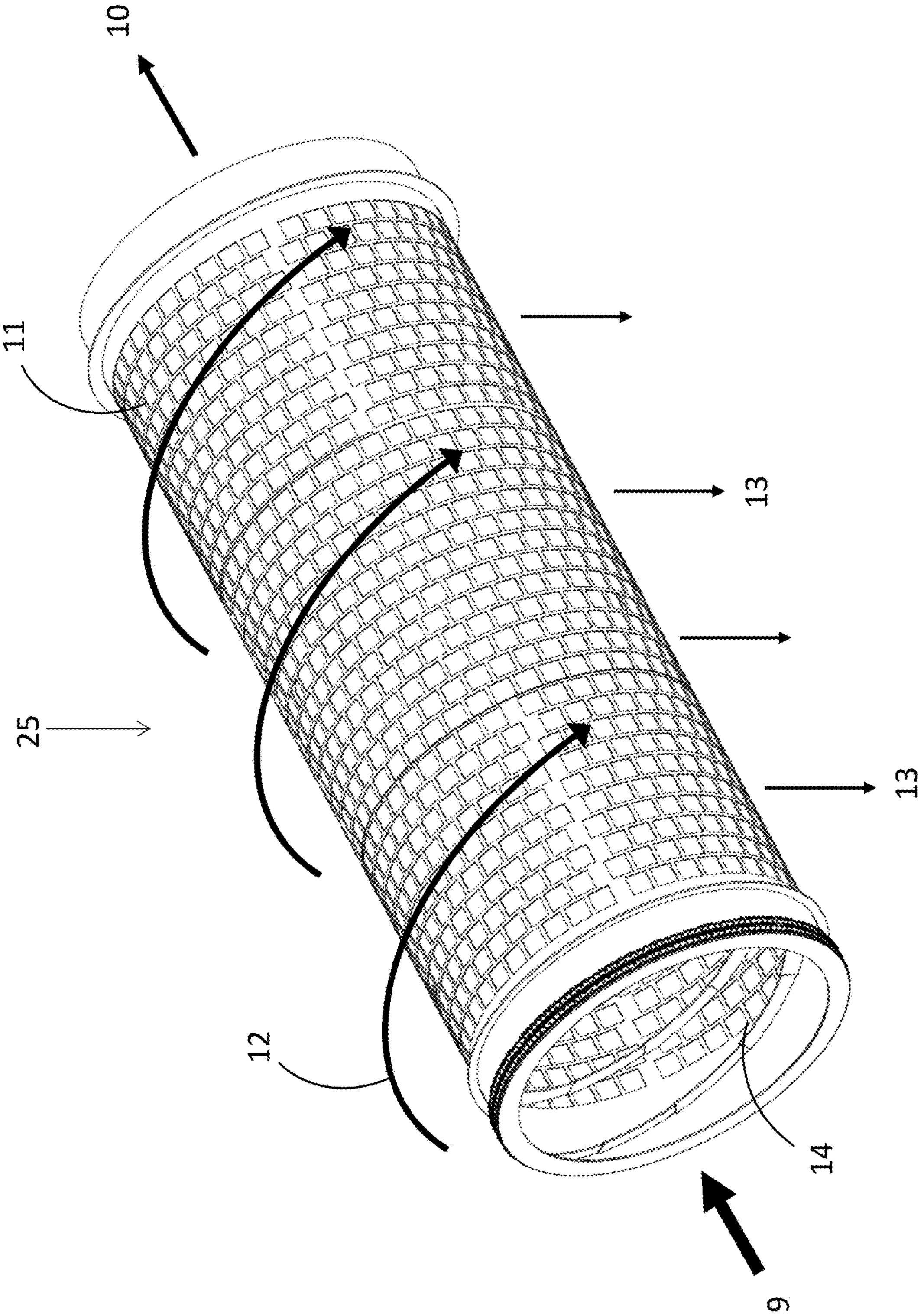
FIG. 3 is a working representation of a drum screen embodiment.
Figure 4:
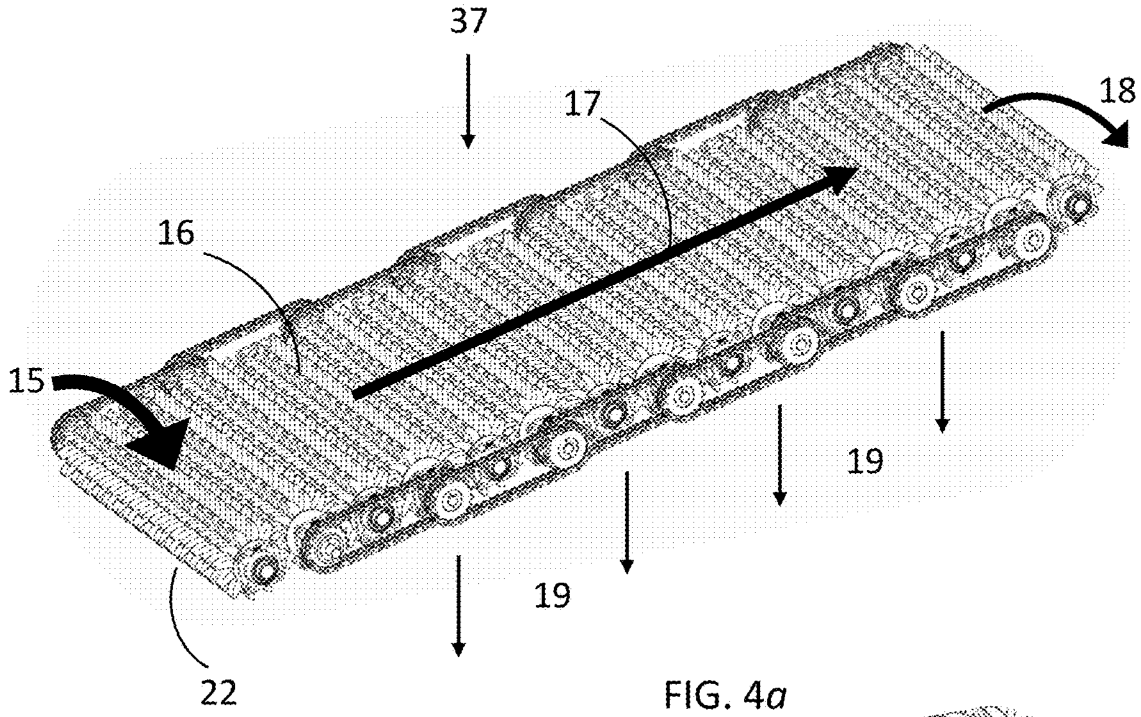
FIG. 4 is a working representation of a disc screen embodiment.
Figure 4A:
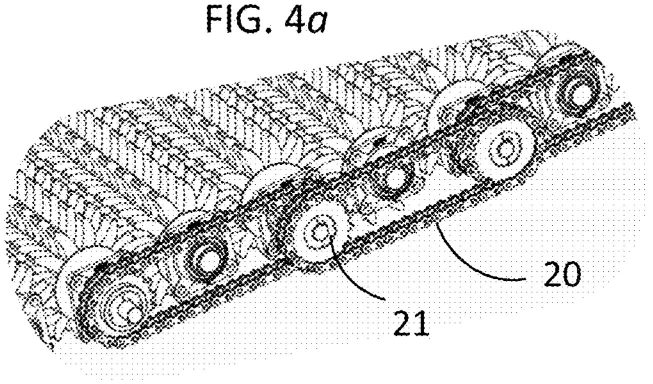
Figure 4B:
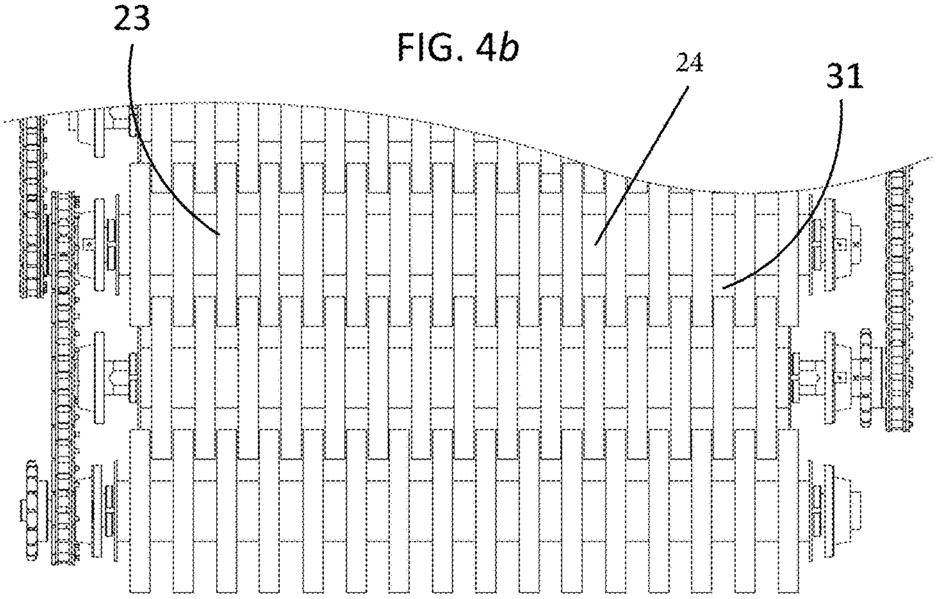

FIG. 3 shows detail of a cylindrical drum screen 25 that can be used as part of the rotary drum screen 2. The cylindrical drum screen 25 has a feed end 9, a discharge end 10, and various apertures (holes) 11. Feed mixed material enters the drum screen 25 at the feed end 9. As the drum screen 25 rotates, the material flows along the drum's inner screening surface 14 in a spiralling 12 motion. This agitates the material, allowing particles 13 smaller than the apertures 11 to pass through the screen 25, while particles larger than the apertures 11 exit the screen 25 at the discharge end 10. Depending on application, the apertures 11 may vary in size and shape, FIG. 4 shows detail of parts of the disc screen 1. The disc screen 1 has an infeed end 15, a discharge end 18, and series of disc rollers 22 arranged in a staggered configuration as illustrated in FIGS. 4*a* and 4*b*. Each disc roller 22 consists of at least one or more discs 23 mounted on a drive shaft 24. The spacing 31 between the disc rollers 22 determines the respective openings. The rows of disc rollers 22 rotate simultaneously in a conveying direction 25, agitating the material as it flows along the screen's top surface 16. Undersized particles 19 fall through the openings 31, while 'oversized particles' 17 continue to move along the screening surface 16 until they exit the screen 1 at the discharge end 18.

Depending on application, the discs 23 can be polygon, circular or star shaped. FIG. 5*a* shows an illustration of a star shaped disc 23.

Each disc roller 22 can have its own one motor drive, or be driven by a single motor drive. The motor drive(s) can be electric, pneumatic, or hydraulic. The disc roller 22 drives can be independent of each other or coupled together. FIG. 4*a* provides an illustration of the disc rollers 22 coupled together via chains 20 and sprockets 21 to provide an integrated single drive (not shown).

FIGS. 5 and 6 show detail of a disc screen embodiment 30 and the drum screen 25 shown in FIG. 3. FIG. 6 show the drum screen 25 and the disc screen 30 able to be combined to form a combination screen 38, (and able to be separated, as discussed hereinafter). According to the invention, the disc screen embodiment 30 is positioned inside the drum screen 25 by insertion as shown. The disc screen embodiment 30 comprises a series of driven disc rollers 26 mounted on an internal support frame 27, which has side walls 27*a* to maintain material on the disc screen embodiment 30 as such material travels along the top surface towards a discharge end.

The disc screen embodiment 30 remains anchored in place while the drum screen 25 is free to rotate 29 in a clockwise or anticlockwise direction. The disc screen embodiment 30 has at least one or more anchor points. These anchor points fix the disc screen embodiment 30 to the apparatus, preferably the frame or housing of the drum screen 25, by means of bolting or pining; or with the use of some sort of mechanical locking device such as a twist lock, spring-loaded latch, or the likes. FIGS. 6 and 7 shows a disc screen embodiment 30 with four anchor points, illustrated by reference numbers 28*a*, 28*b*, 28*c* and 28*d*.

As shown in FIG. 7, the drum screen 25 rotates 29 via a mechanical drive system. This drive system comprises of at least one motor and coupling. The drive motor(s) can be electric, pneumatic, or hydraulic; the drive coupling(s) can include a chain(s), sprocket(s), wheel(s), or the like. This mechanical drive system is either mounted on the apparatus 38, or on the disc screen embodiment 30.

As shown in FIG. 7, the combination of the disc screen 2 and the rotary drum screen 1 has a mixed material feed end 32, a discharge area for oversized material 33, a discharge area for midsized material 34, and a discharge area for undersized material 35. Arrows 32, 33, 34 and 35 in FIG. 7 illustrate the direction in which the material flows through the combination of screens.

FIG. 8 illustrates cross-sectionally a range of alternative or optional disc roller 22 configurations. The illustrations describe these configurations in relation to the drum screen 25 and in relation to the flow of material from left to right:

FIG. 8*a*; illustrates a series of disc rollers 22 like that on the disc screen embodiment 30 described above; the illustration shows a series of disc rollers 22 running in parallel with the longitudinal centre line of the drum screen 25 before arching upwards;

FIG. 8*b* illustrates a series of disc rollers 22 arching upwards towards a discharge end.

FIG. 8*c* illustrates a series of disc rollers 22 angled upwards and in direct line with each other.

FIG. 8*d* illustrates a series of disc rollers 22 angled downwards and in direct line with each other.

FIG. 8*e* illustrates a series of disc rollers 22 running in parallel with the drum screen before angling upward in line with each other towards a discharge end.

FIG. 8*f* illustrates a multiple disc screen embodiment 37 formed of two disc screens in series with each other.

FIG. 8*g* illustrates a series of disc rollers 22 all running straight and planar with the drum screen 25.

FIG. 8*h* illustrates another multiple disc screen embodiment 37 with different orientation.

In another embodiment of the present invention, the combination screen embodiment 38 is detachable 59 from the apparatus described above. The combination screen 38 can be detachable in the same way that a known drum screen is detachable from a housing, illustrated in FIG. 11 by opening of a side housing 60.

In another embodiment according to the invention, the drum screen 25 and disc screen embodiment 30 are detachable from each other, as illustrated in FIG. 6, allowing them to each operate as independent screens, so that the apparatus can operate as a standard trommel screen or as a standard disc screen. When these embodiments are detachable, they allow for a wide range of configurations to suite different applications.

The combination screen 38 can operate as part of a machine with two or more stream of particles sizes. For example; FIG. 9 is an illustration of apparatus capable of producing oversized, midsized, and undersized particles, commonly referred to as a 'three-way-split' machine.

FIG. 9 illustrates the flow of material 47 through a three-way-split machine. In this illustration, feed mixed material 39 as described above enters the combination screen 38 via the feeder 41. The midsized and undersized particles 42 pass through the disc screen openings 31 and onto the drum's screening surface 14 below. The oversize particles 40 flow on top of the disc screen 17 and exit the combination screen 38 at the discharge end 43 and onto a first discharge conveyor 48 for stockpiling. The particles 42 that pass through the disc screen embodiment 30 flow along the drum screen 25 inner surface 14. The undersized particles 44 pass through the drum screen 25 apertures 11 and on to another discharge conveyor 44 below for stockpiling. The midsized particles 45 exits the combination screen 38 at the discharge end 45. An inline discharge conveyor 46 collects the midsize particles 45 for stockpiling.

FIG. 10 is an illustration of apparatus capable of producing oversized and undersized particles, commonly referred to as a "two-way-split" machine.

FIG. 10 illustrates the flow of material 49 through a two-way split machine. Feed mixed material 50 as described above enters the combination screen 38 via the feeder 51. The midsized and undersized particles 52 pass through the disc screen openings 31 and onto the drum screening surface 14 below. The oversized particles 53 flow on top of the disc screen 17 and exit the combination screen 38 at the discharge end 54. The particles 52 that passes through the disc screen embodiment 52 flow along the drum screen inner surface 14. The undersized particles 55 pass through the drum screen apertures 11 and on to a first inline under conveyor 56 and then a transverse discharge conveyor 55*a* for separate stockpiling. The midsized particles 57 exit the combination screen 38 at the discharge end.

In FIG. 10, the first discharge conveyor 48 has been removed away from its position shown in FIG. 9, (for example by horizontal, vertical, or lateral movement, or a combination of same), and is not shown for clarity. As such, the oversize particles 53 from the top of the disc screen 17 exit at the discharge end 43 and fall, so that only one discharge conveyor 58 collects and discharges both the oversized 53 and midsized 57 particles together, for further processing or stockpiling.

The present invention provides a combination screening apparatus for screening a mixed material into three graded streams, comprising a disc screen wholly, substantially or partly located within a rotary drum screen. The present invention is convenient on a mobile chassis with a simple arrangement of a feed hopper to feed a feed end, and a layered or stacked configuration for the discharge of the so-formed graded streams at a discharge end.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. A combination screening apparatus for screening a mixed material into three graded streams using a disc screen and a rotary drum screen, the disc screen being wholly or substantially located within the rotary drum screen, the apparatus including a rotary drum screen housing with a door mounted on the side of the drum screen housing, the drum screen housing configured to contain the disc screen and drum screen during operation;

wherein either the disc screen or the rotary drum screen, or both the disc screen and the rotary drum screen, are removable from the housing; and wherein at least a portion of the disc screen curves upwardly towards a discharge end within the housing;

wherein the drum screen and the disc screen are configured to be combined to form a combination screen, with the disc screen positioned inside the drum screen;

wherein the drum screen and the disc screen are further configured to be separable from each other, allowing the disc screen and the drum screen to each operate as independent screens, and wherein the combination screen is detachable and removable from the apparatus through the door on the side of the drum screen housing.

2. The apparatus as claimed in claim 1 being a mobile apparatus, and having a tracked chassis.

3. The apparatus as claimed in claim 1, further comprising one or more conveyors to convey one or more of the three graded streams away from the apparatus.

4. The apparatus as claimed in claim 3, comprising two conveyors to convey two of the graded streams away from the apparatus.

5. The apparatus as claimed in claim 3, comprising three conveyors to convey the three graded streams separately away from the apparatus.

6. The apparatus as claimed in claim 1, wherein the disc screen comprises a series of discs mounted on driven shafts.

7. The apparatus as claimed in claim 6, wherein the discs are a shape selected from a group consisting of: a polygon, circular, or a star shape.

8. The apparatus as claimed in claim 1, wherein the disc screen is mounted on a disc frame securable to the rotary drum screen.

9. The apparatus as claimed in claim 8, wherein the disc frame includes a disc drive mechanism.

10. The apparatus as claimed in claim 8, wherein the disc frame provides side walls to the disc screen.

11. The apparatus as claimed in claim 1, further comprising an integral feeder hopper.

12. The apparatus as claimed in claim 1, further comprising a discharge conveyor, the discharge conveyor being movable between an active state where the discharge conveyor is located proximate to the discharge end of the disc screen for receiving particulate from the discharge end of the disc screen, and an inactive state where the discharge conveyor is not located at the discharge end of the disc screen and does not receive particulate from the discharge end of the disc screen.

13. A method of grading a mixed material into three graded streams, comprising at least the steps of:

providing a combination screening apparatus comprising a disc screen wholly or substantially located within a rotary drum screen, the apparatus including a rotary drum screen housing with a door mounted on the side of the drum screen housing, the drum screen housing configured to contain the disc screen and drum screen during operation, wherein either the disc screen or the rotary drum screen, or both the disc screen and the rotary drum screen, are removable from the housing, and wherein at least a portion of the disc screen curves upwardly towards a discharge end within the housing; wherein the drum screen and the disc screen are configured to be combined to form a combination screen, with the disc screen positioned inside the drum screen; wherein the drum screen and the disc screen are further configured to be separable from each other, allowing the disc screen and the drum screen to each operate as independent screens, and wherein the combination screen is detachable and removable from the apparatus through the door on the side of the drum screen housing;

locating the mixed material onto an inlet end of the disc screen; and operating the rotary drum screen and the disc screen to provide three graded streams from the disc screen and rotary drum screen.

14. The method of grading a mixed material of claim 13 wherein the apparatus includes a discharge conveyor, the discharge conveyor being movable between an active state where the discharge conveyor is located proximate to the discharge end of the disc screen for receiving particulate from the discharge end of the disc screen, and an inactive state where the discharge conveyor is not located at the discharge end of the disc screen and does not receive particulate from the discharge end of the disc screen; and wherein before the step of operating the rotary drum screen and the disc screen the method comprises the step of:

positioning the discharge conveyor in it active state.

* * * * *